(12) United States Patent
Gokulrangan

(10) Patent No.: US 6,658,512 B1
(45) Date of Patent: Dec. 2, 2003

(54) ADMISSION CONTROL METHOD FOR DATA COMMUNICATIONS OVER PERIPHERAL BUSES

(75) Inventor: Venkat R. Gokulrangan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 09/671,236

(22) Filed: Sep. 28, 2000

(51) Int. Cl.[7] ............................. G06F 13/362; H04J 3/14
(52) U.S. Cl. ..................... 710/117; 710/107; 709/227; 370/232
(58) Field of Search ........................... 709/227–229; 370/230–234; 710/107–125

(56) References Cited

U.S. PATENT DOCUMENTS

| | | | | |
|---|---|---|---|---|
| 5,289,462 A | * | 2/1994 | Ahmadi et al. | 370/232 |
| 5,347,511 A | * | 9/1994 | Gun | 370/255 |
| 5,533,009 A | * | 7/1996 | Chen | 370/232 |
| 5,533,205 A | * | 7/1996 | Blackledge et al. | 710/117 |
| 5,568,165 A | * | 10/1996 | Kimura | 345/547 |
| 5,594,717 A | * | 1/1997 | Watanabe et al. | 370/232 |
| 5,805,599 A | * | 9/1998 | Mishra et al. | 370/468 |
| 5,815,492 A | * | 9/1998 | Berthaud et al. | 370/234 |
| 5,832,300 A | * | 11/1998 | Lowthert | 710/33 |
| 5,896,413 A | * | 4/1999 | Yoshimura et al. | 375/219 |
| 5,940,370 A | * | 8/1999 | Curtis et al. | 370/231 |
| 5,982,748 A | * | 11/1999 | Yin et al. | 370/232 |
| 5,982,750 A | * | 11/1999 | Tabe et al. | 370/233 |
| 5,986,714 A | * | 11/1999 | Marino | 375/240.05 |
| 6,084,955 A | * | 7/2000 | Key et al. | 379/220.01 |
| 6,145,040 A | * | 11/2000 | LaBerge et al. | 710/107 |
| 6,215,768 B1 | * | 4/2001 | Kim | 370/230 |
| 6,292,466 B1 | * | 9/2001 | Droz | 370/232 |
| 6,295,516 B1 | * | 9/2001 | Takeyasu | 703/13 |
| 6,359,862 B1 | * | 3/2002 | Jeffries et al. | 370/232 |
| 6,359,863 B1 | * | 3/2002 | Varma et al. | 370/232 |
| 6,359,889 B1 | * | 3/2002 | Tazaki et al. | 370/395.61 |
| 6,400,685 B1 | * | 6/2002 | Park | 370/232 |
| 6,438,141 B1 | * | 8/2002 | Hanko et al. | 370/477 |
| 6,459,681 B1 | * | 10/2002 | Oliva | 370/232 |
| 6,487,170 B1 | * | 11/2002 | Chen et al. | 370/231 |
| 6,490,249 B1 | * | 12/2002 | Aboul-Magd et al. | 370/232 |
| 6,542,467 B2 | * | 4/2003 | Umayabashi | 370/236 |

* cited by examiner

Primary Examiner—Sumati Lefkowitz
(74) Attorney, Agent, or Firm—Antonelli, Terry, Stout & Kraus, LLP

(57) ABSTRACT

A method adaptively controls admission of a plurality of resources to a peripheral bus having a finite bandwidth. It monitors the actual data transfer rate of each resource having a bandwidth guarantee on the peripheral bus for data communications. Upon receiving a request for admission to the peripheral bus from an additional resource, a utilization value representative of the extent to which the plurality of resources utilizes the guaranteed bandwidth on the peripheral bus is obtained. The additional resource is admitted to the peripheral bus if the utilization value indicates that the amount of unutilized bandwidth on the peripheral bus is approximately sufficient to satisfy the data transfer rate of the additional resource.

29 Claims, 4 Drawing Sheets

ADMISSION CONTROL METHOD FOR DATA COMMUNICATIONS OVER PERIPHERAL BUSES

BACKGROUND

1. Field of the Invention

This invention relates generally to data communications. In particular, the present invention relates to methods of controlling the admission of a plurality of data communications on a peripheral bus for a computing device having a finite bandwidth.

2. Description of the Related Art

Communication links, such as peripheral buses in a network, can transfer data for a plurality of different computing devices, software applications and other resources resident on the network. The data from a computing device, application or other resource can be transferred over a peripheral bus using a Class of Service (CoS) or other method which provides timeline, maximum error rate or other Quality of Service (QoS) guarantees. Some transfer classes reserve and pre-allocate part of the bandwidth of the peripheral bus in advance for continuous and constant guaranteed availability to the resource. (Although the peripheral bus may be any kind of a cable, fiber optic, wired connection or wireless connection, the term "bandwidth" is nevertheless used herein to refer to the amount of data which can be transferred per unit of time, typically in bits per second (b/s) or bytes per second (B/s), and does not refer to the frequency range over which the peripheral bus transfers data.)

However, resources requesting guaranteed bandwidth do not always use all of the bandwidth they request for various reasons. For example, the amount of bandwidth requested is usually that amount which is sufficient to handle the worst case scenario (typically the expected peak data transfer rate). For example, a multimedia application receiving data through a digital subscriber line (DSL) controller might request 50% of a approximately 1.5 mbps throughput rate as a worst case scenario, where the best scenario scenario might be 25% of the throughput rate. Devices, application and resources do not always receive data at the maximum possible rate and therefore the average data transfer rate is often less than the peak data transfer rate. Also, the nature of some resources may require varying degrees of encoding/compression of data and thus cause the actual data transfer rate to vary substantially from the average data transfer rate. This is especially true of devices, such as video cameras, and applications, such as multimedia content player, which utilize real-time adaptive compression or decompression algorithms. This is a problem for communication systems which do not allow variable bit rate transfers. The reserved bandwidth pre-allocated to the device, application or resource will frequently go unused and wasted. The proportion of wasted bandwidth may very well increase significantly if the amount of bandwidth reserved by one or more devices, applications or resources increases and/or if the amount of bandwidth on the peripheral bus increases.

Furthermore, in some computer systems and networks, the devices, applications and resources are merely expected to be "good citizens" which will request only as much bandwidth as they will need and allow as much bandwidth as possible to remain to be used by other devices, applications or resources. See, for example, "An Analysis of Throughput Characteristics of Universal Serial Bus" by John Garney, Intel Corporation, Dec. 6, 1996. Such a computer system or network may not have any protections against faulty or rogue devices, applications or resources which inappropriately reserve bandwidth or reserve an inordinately large fraction of bandwidth. Therefore, the bandwidth on a peripheral bus may be hoarded by a resource or otherwise under-utilized.

BRIEF DESCRIPTION OF THE DRAWINGS

A better understanding and appreciation of the foregoing and of the attendant advantages of the present invention will become apparent from the following detailed description of example embodiments of the invention in conjunction with the accompanying drawings. While the foregoing and following written and illustrated disclosure focuses on disclosing example embodiments of the invention, it should be clearly understood that the same is by way of illustration and example only and the invention is not limited thereto.

The following represents brief descriptions of the drawings, wherein.

DETAILED DESCRIPTION

This application describes various example embodiments of the invention. Generally, the example embodiments involve a modified Universal Serial Bus (USB) communications system connecting a host computer system with a collection of modified USB devices. Typically, corresponding pieces of software and hardware in the host computer system and a USB device enable them to perform a function. However, the invention is not limited in its implementation to the USB example embodiments described in this application or to any other kind of communications system. Examples of other possible peripheral buses include IEEE 1394 and Firewire. Examples of possible communication systems include a wide area network (WAN), a campus area network (CAN), a metropolitan area network (MAN), a global area network (GAN), a storage area network (SAN), and a LAN network, including versions of Gigabit Ethernet, FDDI (Fiber Distributed Data Interface), Token Ring, Asynchronous Transfer Mode (ATM), Fibre Channel and Wireless. Of course, a wide variety of implementations, arrangements and configurations of all types of data communication systems and networks may be used with the invention.

This application also describes various example methods of adaptive admission control of data communications over peripheral buses. These example methods may be used in the example modified USB communication systems in this application or in any other suitable communications system. In any case, the scope of the invention should be determined by reference only to the claims contained in any patent issuing from this application and is not limited by any of the examples described herein.

Figure 1:
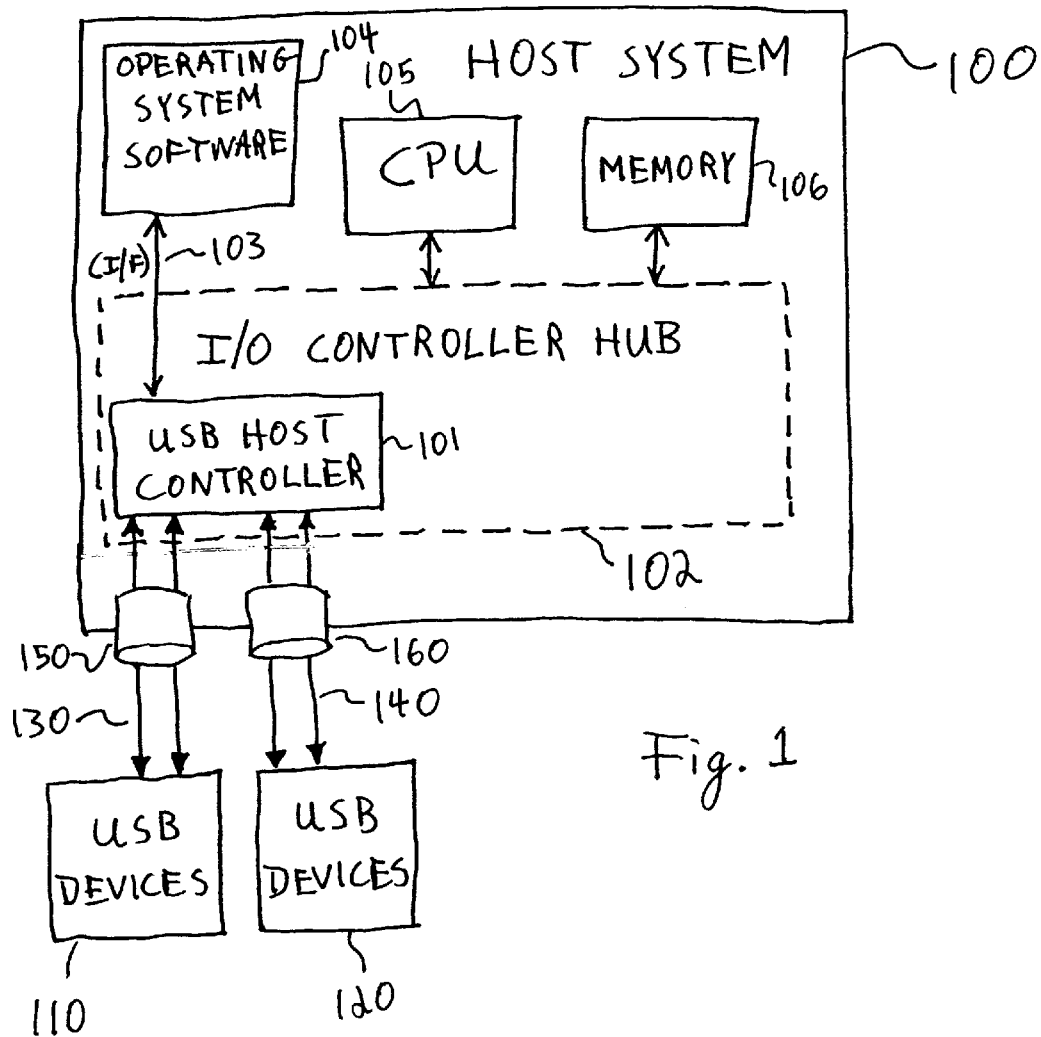
FIG. 1 is a generalized block diagram of an exemplary computer system in which an example embodiment of the invention may be implemented.

For the sake of simplicity, discussions will concentrate mainly on an example modified USB data communication system, the general architecture of which is shown in the block diagram of FIG. 1, even though the scope of the present invention is not limited thereto. While a host computer system 100 with operating system software, at least one central processing unit (CPU) 105 and memory 106 is utilized in the example embodiment shown in FIG. 1, the present invention is applicable for use with all types of processing devices and systems, including any device or system which may be linked together with other disparate processing devices or systems such as computers, servers, peripherals, and storage devices through a peripheral bus in a communications network. The host system may consist of a processing system with limited resources, so long as it is able to support a USB host controller. The USB host controller may be located in an Input/Output Controller Hub (ICH) 102 as shown in FIG. 1 (other elements located in ICH 102 are not shown for the sake of simplicity); on a motherboard along with CPU 105 and/or memory 106; or on another board, such as a printed circuit board. The location and packaging of the USB host controller 101 is not limited to any of the mentioned examples or limited in any other way. Conversely, the host system may be a large computer system containing a plurality of processors, storage units, etc, such as a server complex. Such a large computer system may have a plurality of USB host controllers, either combined or on separate units. Similarly, any type of USB device may be connected in the example embodiments described herein. Examples of possible USB peripheral devices include, but are not limited to, disk drives, printers, modems, keyboards, mice, pointing devices, video cameras, and audio devices.

In the example embodiment of FIG. 1, two separate groups of USB devices 110 and 120 are interconnected to the USB host controller 101 of a host computer system 100 through respective USB buses 130 and 140. The USB host controller 101 controls communications on the USB buses 130 and 140, and transfers data between the USB buses 130 and 140 and the remainder of the host computer system 100. USB host controller 101 has a root hub (not shown) in it or directly attached to it. The root hub has a port 150 (called a root port) associated with USB bus 130 which is the physical connection between USB bus 130 and USB host controller 111 and a port 160 associated with USB bus 140 which is the physical connection between USB bus 140 and USB host controller 111. USB bus 130 connected to root port 150 (and USB bus 140 connected to port 160 of the root hub) is formed by the combination of a cable along with a voltage and ground line (not shown). Although only two ports are shown in FIG. 1, the root hub can have up to six ports and six corresponding USB buses rather than the two ports 150 and 160 and two USB buses 130 and 140 shown in FIG. 1.

With the addition of additional equipment (not shown), such as one or more "downstream" (non-root) hubs attached to root port 130 and/or port 140 of the root hub and/or other non-root hubs, USB host controller 101 may support up to 127 connected devices or functions. There is one "upstream" port and up to six "downstream" ports on non-root hubs, with each one of the downstream ports connecting the non-root hub to another hub or to a USB device through a USB cable. A USB hub may be a stand-alone device or it may be included within the chassis of a USB device, such as a keyboard. With operating system software 104 such as Windows 98® or Windows 2000® from Microsoft Corporation of Redmond, Wash. in host computer system 100, it is possible to plug any USB device into any USB port on any connected USB hub and the operating system software 104 will, upon activation of the host computer system 100, identify the USB device and interface to it. The user does not need to be concerned with setting up various communications parameters when connecting a USB device.

Figure 2:
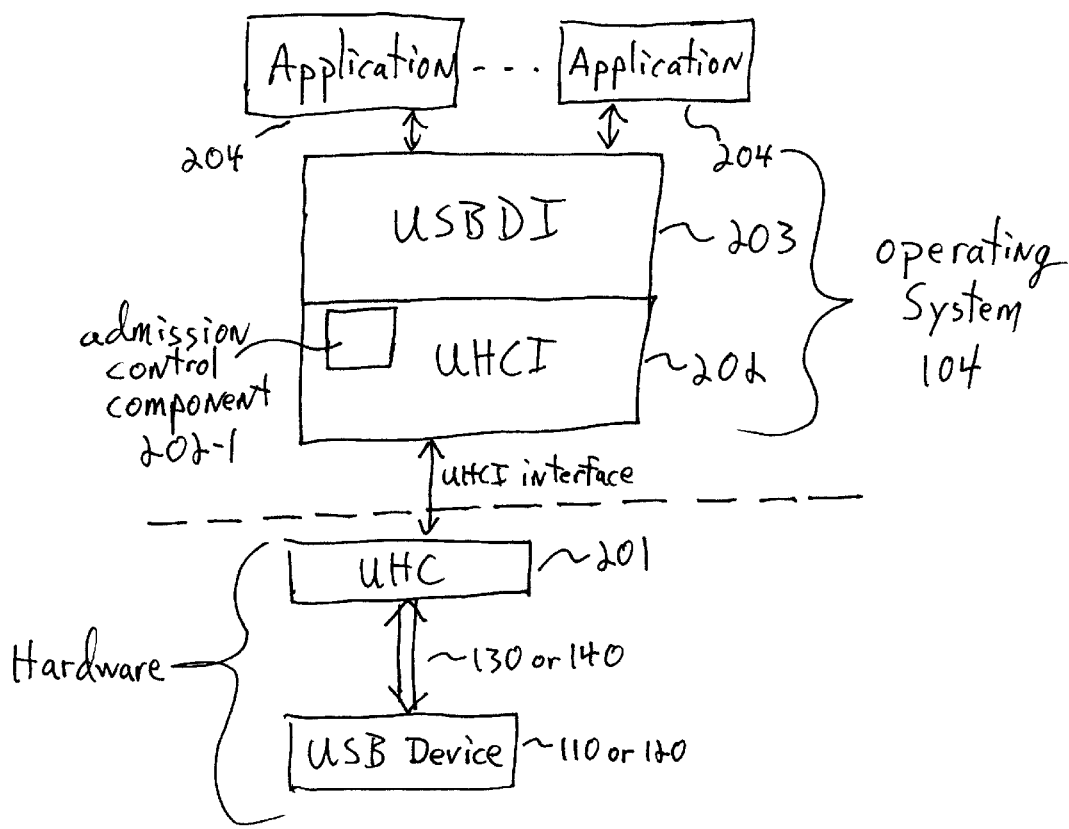
FIG. 2 illustrates an example of the hardware and software layers related to the example embodiment of the invention in the exemplary computer system of FIG. 1.

When USB host controller 101 receives data from any connected USB device, such as one of the USB devices in groups 110 and 120, it sends a message to the operating system software 104 of the host system 100 over an interface 103. Further details of the example embodiment related to the interaction between USB host controller 101 and the software in host processing system 100 are illustrated in FIG. 2. When appropriate, like reference numerals and characters may be used in the various figures to designate identical, corresponding or similar components in differing figures. Further, in the detailed description of the various figures, exemplary sizes/mode/s/values/ranges may be given, although the present invention is not limited to the same. Also, well-known power and other connections to the components are not be shown for simplicity of illustration and discussion, and to avoid obscuring the invention.

In the example of FIG. 2, USB host controller 101 is a Universal Host Controller (UHC) 201 and the interface 103 between UHC 201 and the software of host processing system 100 is the Universal Host Controller Interface (UHCI), Revision 1.1, March 1996. UHC 201 may be a stand-alone integrated circuit (IC) or it may be included as part of an I/O controller hub (ICH) having other I/O interfaces or it may be implemented in some other manner. A portion of UHC 201 is software or firmware provided in a chipset, an ICH, random access memory (RAM), read-only memory (ROM), programmable read-only memory (PROM), erasable programmable read-only memory (EPROM), or any other suitable form of storage in the host system. (Alternatively, USB host controller 101 may be an Open Host Controller (OHC) and the interface between the OHC and the software of host processing system 100 may be an Open Host Controller Interface (OHCI). In UHCI, most of the functions are carried out in software or firmware so that the hardware has lower gate counts and is cheaper to manufacture. On the other hand, in OHCI, more of the functions are carried out in the hardware, which means that OHCI is relatively more expensive.)

UHC 201 transfers data back and forth between a USB buses 130 and 140 and a system bus of host computer system 100. According to the example embodiments of the invention, the operating system software 104 of host processing system 100 preferably includes a UHCI software layer 202 which is a modification of the UHCI layer described in the specifications for the Universal Host Controller Interface (UHCI), Revision 1.1, March 1996. Although UHCI layer 202 is a modified software layer, it nevertheless communicates with UHC 201 over the system bus of host computer system 100 in a manner in accordance with the UHCI specifications. (UHCI layer 202 need not be implemented in operating system software 104. It could, for example, be implemented in an ICH or other I/O controller or it could be stored in an EEPROM implemented on a circuit board or I/O card. UHCI layer 202 may be stored at the time of manufacture or assembly of host computer system 100 or it may be later downloaded into host computer system 100.) A USB Device Interface (USBDI) layer 203 provides an application programming interface (API) to UHCI layer 202 and one or more software applications 204.

Regardless of the implementation of UHC 201 and UHCI layer 202, they support classes of data communications according to USB 1.1 and/or USB 2.0 in which bandwidth is guaranteed as well as classes of data communications in which the bandwidth is not guaranteed. Non-guaranteed USB data transfers include interrupt transfers and bulk transfers. Guaranteed USB data transfers include control transfers and isochronous transfers. Control transfers are used for handshaking, initialization of USB devices, etc. Interrupt transfers are on-demand transfers of small amounts of data. Since control transfers and interrupt transfers involve relatively small amounts of data, they do not typically present any bandwidth utilization problems. In bulk transfers, the data to be sent is posted in a buffer and is eventually sent with the lowest priority, i.e., when other data packets are needed to meet the deadlines of other data transfers on the same stream. These transfers are typically used for devices, such as printers, which are not time-sensitive. Although bulk transfers may contain large amounts of data, they usually are not a problem since they are categorized as the lowest priority transfer.

On the other hand, an isochronous transfer is a class of data communications in which a percentage of the bandwidth of the USB bus, sufficient to complete requested data transfers from the device, application or resource, is reserved and guaranteed in advance of the data transfer in accordance with the output bit rate of the device, application or resource. The necessary bandwidth is specified by the requesting device, application or resource itself in a "request for admission" made to the host controller of the USB bus. It is important that adequate bandwidth is requested by the USB device, application or resource since any data provided at a bit rate faster than the specified bit rate will be dropped during transfer. For this reason, the USB device or application usually calculates the amount of requested bandwidth from its required timeline guarantees for data delivery.

When the "request for admission" is made, an admission controller for the corresponding USB bus deterministically checks to see if the available bandwidth on the corresponding USB bus is sufficient to satisfy the requirements of the requesting application. In the circumstance of multiple isochronous devices, the admission controller typically operates according to a First-Come-First-Serve (FCFS) policy in which requests are considered sequentially in the order received. Therefore, if one or more previous requests for admission have been granted, then the admission controller checks to see if the remaining bandwidth which has not been previously allocated and guaranteed can meet the requirements of the currently requesting resource. If it can, then the request for admission is granted. If it can't, then the request for admission is denied.

Regardless of the number of connected hubs and USB devices in the data communication system, USB host controller 101 can only transfer a finite amount of bandwidth which must be shared between all of the connected USB devices. For example, an optical disk drive (i.e., Compact Disc Read Only Media (CD-ROM), Compact Disc Read/Write Media (CD-RW), Digital Versatile Disc Read Only Media (DVD-ROM) or Digital Versatile Disc Random Access Media (DVD-RAM)), a modem or other communication device and/or various multimedia devices may be simultaneously connected to the same USB bus. If any one of these devices hoards the USB isochronous bandwidth, it may prevent a new device from being admitted even though it does not utilize all of the bandwidth it is allocated. At worst, a misoperating or rogue device (or application on a device) can "hijack" the entire USB bus without actually performing any transfer and not allow any other application to be admitted to transfer data over the USB bus.

In order to cope with the problem in which bandwidth is mis-allocated or is allocated in accordance with the peak transfer rate of true isochronous devices, the example embodiments of the invention use a new data transfer class which will be called "Quasi-isochronous" or "Q-chronous". This quasi-isochronous class provides only a "virtual" isochronous transfer guarantee as opposed to real isochronous transfer guarantee provided in the isochronous transfer class. Data is transferred only when the peripheral bus is not fully utilized by true isochronous transfers or when small data packets can be transferred in intervals left vacant by true isochronous transfers. On the other hand, during bursty transfers from true isochronous devices or during lack of availability of bandwidth, the data in a quasi-isochronous transfer is not transferred and is dropped, if necessary. This quasi-isochronous class has relaxed delivery constraints, which are bound to be best-effort in the presence of peak-rate true isochronous data transfers, but which lead to an efficient utilization of the isochronous bandwidth whenever possible.

Figure 3:
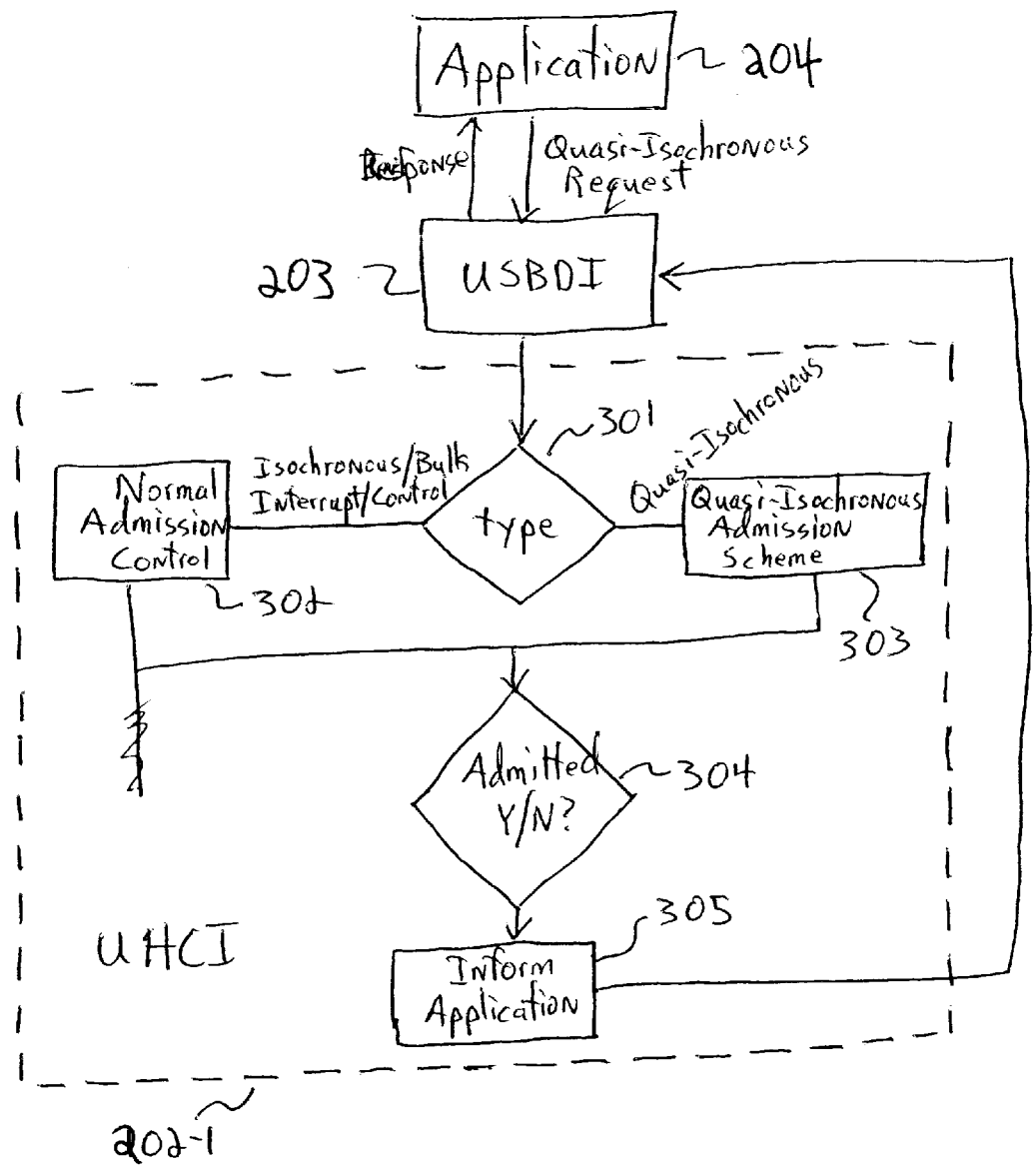
FIG. 3 illustrates an exemplary admission control method carried out in the Universal Host Controller Interface (UHCI) layer of FIG. 2 according to an example embodiment of the invention.

To implement the quasi-isochronous transfer class to efficiently use the finite USB isochronous bandwidth, the example embodiments of the invention include an admission control component 202-1 utilizing a unique adaptive bandwidth allocation scheme, different than the conventional FCFS admission policy, for those USB devices which are capable of quasi-isochronous transfers when they request quasi-isochronous transfers. As shown in FIG. 3, when 20 an admission request is received, such as from one of the applications 204 through USBDI layer 203, the admission control component 202-1 determines whether the requested transfer is either: 1) one of a conventional isochronous, bulk, interrupt or control transfer request; or 2) a quasi-isochronous transfer request (step 301 in FIG. 3). If the admission request is a conventional isochronous, bulk, interrupt or control transfer, then the conventional admission control method is performed (step 302) to determine whether or not to admit the request. If the admission request is for a quasi-isochronous transfer, then a quasi-isochronous admission scheme is performed (step 303). Both admission schemes provide a yes/no result (step 304) and the admission control component informs the requesting application of the result (step 305).

Preferably, UHCI layer 202 or admission control component 202-1 dynamically monitors the actual isochronous bandwidth being used on the corresponding USB bus. When a quasi-isochronous transfer request is received, admission control component 202-1 in UHCI layer 202 adaptively grants admission to the request using a fair-share adaptive scheduling algorithm in quasi-isochronous admission scheme 303 which is based at least in part on the "real available bandwidth" rather than only on the bandwidth presumed to be available because it has not been previously allocated to isochronous transfer requests. The quasi-isochronous admission scheme 303 in admission control component 202-1 utilizes the actual available bandwidth to allocate the remaining bandwidth to quasi-isochronous transfer requests in a manner which may or may not be loosely based on the FCFS policy. Although not shown in the drawings, alternative embodiments of the invention may utilize hardware (or software) in UHC 201 to dynamically monitor the actual available bandwidth and/or may include an admission control component performing the same adaptive admission policy for quasi-isochronous transfers as that of admission control component 202-1.

Figure 4:
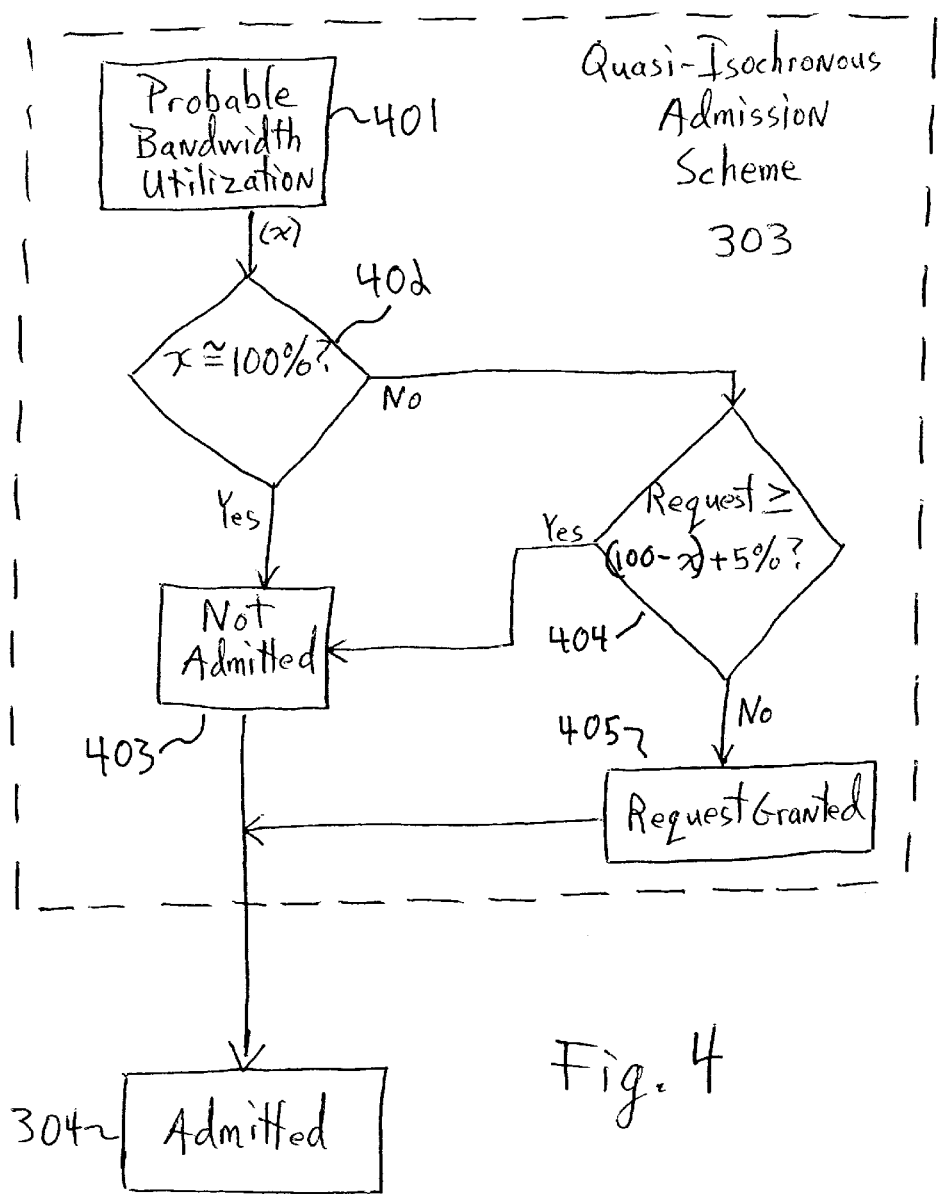
FIG. 4 illustrates an exemplary quasi-isochronous admission scheme carried out in the exemplary admission control method shown in FIG. 3.

While a plurality of different quasi-isochronous admission schemes may be used in accordance with this invention, FIG. 4 illustrates an example quasi-admission scheme 303 in which the actual available bandwidth determined by dynamically monitoring the USB bus is supplemented with feedback control scheme(s), such as predicted transfer rate, to calculate a percentage value "(x)" representing the probable bandwidth utilization (step 401) used in the the adaptive admission policy. The quasi-isochronous admission scheme first determines whether or not the probable bandwidth utilization is approximately equal to 100% (step 402). If it is, then the quasi-isochronous transfer request is not admitted (step 403). If the probable bandwidth utilization "x" is less than approximately 100%, then it is next determined (step 404) whether or not the amount of bandwidth requested in the quasi-isochronous request is greater than the probable available bandwidth (100%–"x") plus a small margin (for example, 5%) as shown in FIG. 4). If the amount of bandwidth in the quasi-isochronous transfer request is greater, then the request is not admitted (step 403). If the amount of bandwidth in the quasi-isochronous transfer request is not greater, than the quasi-isochronous transfer request is granted (step 405). The admitted yes/no result of quasi-isochronous admission scheme 303 is reported by step 304 in FIG. 3 in the same manner as the results for conventional admission control scheme 302.

The advantages of the availability of the quasi-isochronous transfer class and quasi-isochronous admission scheme can be illustrated by an example. Assume that a first device or application has a peak transfer rate requirement equal to 70% of the bandwidth of the peripheral bus and that a second device or application has a peak transfer rate requirement equal to 30% of the bandwidth of the peripheral bus. Conventionally, a third device or application, requiring only 10% of the bandwidth, will not be admitted even if the first device or application normally transfers data taking up only 40% of the bandwdith and the second device or application normally transfers data taking up only 20% of bandwidth. In the example embodiments of the invention, the third device or application can be admitted to transfer data on the peripheral bus as a quasi-isochronous data transfer.

As would be appreciated by one of ordinary skill in the art, the calculation of probable bandwidth utilization (step 401) of a USB bus can be carried out according to many different algorithms and with varying degrees of precision. For example, the calculation could engage in a detailed historical analysis of data transfers on the communication link with varying amounts of historical data being stored. The trade-off between the precision of the calculation of probable bandwidth utilization in step 401 and the demands on the resource(s) supporting the admission control component including quasi-isochronous admission scheme 303 should be taken into account. For example, if the admission control component is implemented in the UHC 201, there may be limited amount of local memory available to store data. Also, if the admission control component is implemented in a UHCI layer 202 in operating system 104, calculation of probable bandwidth utilization in step 401 could be slowed because of other tasks occurring in host computer system 101.

Preferably, the raw data obtained by dynamically monitoring the peripheral bus is not stored in unaltered form. Instead the data is immediately processed to arrive at a representation or approximation of the bandwidth utilization on the peripheral bus. The monitored data could be processed with the result used to control transitions in a state diagram in which each state in the state diagram corresponds to a different level of bandwidth utilization (i.e., there could be 11 states corresponding to 0%, 10%, 20%, . . . 90%, 100% bandwidth utilization). The number of states and/or the frequency of monitoring and/or the length of time for which state information is stored could be determined in advance (for example, in a hardware implementation) or could be controlled and changed as a user preference (for example, through software controls when the admission control component is implemented in software). Once the state information is determined, the raw data may be discarded. The probable bandwidth utilization 401 at the time of a quasi-isochronous transfer request can be determined by examining the history of state transitions in the state diagram. While any design could be selected, sufficient resources should be available or dedicated to carry out quasi-isochronous admission scheme 303.

The invention maximizes the bandwidth utilization of any peripheral bus link which does not support variable bit rate transfers, such as USB and IEEE 1394/Firewire, in the presence of multiple isochronous transfers or transfers of variable volumes of data from different devices or applications which have an advance guarantee of available bandwidth. By using the new quasi-isochronous transfer class described herein in the example of a USB bus, the invention allows the admission of devices and applications with lower timing constraints, and improves the data throughput of the data transfers, which would otherwise have to resort to bulk transfer, seriously compromising their delivery constraints. It is especially advantageous for communication devices such as modems, especially with emerging applications such as Voice over Internet Protocol (VoIP), and for multi-media applications, such as video, which using adaptive compression/decompression techniques but nevertheless are QoS sensitive.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A communications system controlling the admission of resources to a peripheral bus in the communications system, the communications system comprising:

a peripheral bus having a finite bandwidth;

a plurality of resources, connected to the peripheral bus, and configured to send and/or receive data over the peripheral bus; and a communications controller connected to the peripheral bus, said communications controller adapted to:

monitor the actual data transfer rate on the peripheral bus of each of said plurality of resources having a bandwidth guarantee on the peripheral bus for data communications;

obtain a utilization value representative of the extent to which the plurality of resources utilizes the guaranteed bandwidth on the peripheral bus upon receiving a quasi-isochronous request for admission to the peripheral bus from an additional resource; and admit the additional resource to the peripheral bus if the utilization value indicates that the amount of unutilized bandwidth on the peripheral bus is approximately sufficient to satisfy the data transfer rate of the additional resource.

2. The communications system recited in claim 1, wherein if the additional resource is admitted but the unutilized bandwidth is insufficient to transfer all of the bits of the additional resource, then the extraneous bits are dropped without being transferred over the peripheral bus.

3. The communications system recited in claim 1, wherein the step of obtaining a utilization value comprises monitoring the data traffic on the peripheral bus with an admission control component on a host system.

4. The communications system recited in claim 3, wherein the admission control component manages a state diagram.

5. The communications system recited in claim 4, wherein the states of the state diagram respectively correspond to different degrees of bandwidth utilization.

6. The communications system recited in claim 5, wherein the admission control component maintains a historical analysis of the data traffic on the peripheral bus.

7. The communications system recited in claim 1, wherein the peripheral bus is a USB bus.

8. The communications system recited in claim 7, wherein one of the plurality of resources contains a codec and sends and/or receives data having a variable bit rate.

9. The communications system of claim 1, wherein said plurality of resources comprise a plurality of Universal Serial Bus (USB) devices and said peripheral bus comprises a USB bus.

10. The communications system of claim 1, wherein obtaining the utilization value is performed only for the quasi-isochronous request.

11. The communications system of claim 1, wherein monitoring the actual data transfer rate comprises monitoring actual isochronous bandwidth being used on the peripheral bus.

12. A method of adaptively controlling admission of a plurality of resources to a peripheral bus having a finite bandwidth, said method comprising:

for each one of a plurality of resources having a bandwidth guarantee for data communications on the peripheral bus, monitoring the actual data transfer rate on the peripheral bus of each one of said plurality of resources;

upon receiving a quasi-isochronous request for admission to the peripheral bus from an additional resource, obtaining a utilization value representative of the extent to which the plurality of resources utilizes the guaranteed bandwidth on the peripheral bus for data communications; and admitting the additional resource to the peripheral bus if the utilization value indicates that the amount of unutilized bandwidth on the peripheral bus is approximately sufficient to satisfy the data transfer rate of the additional resource.

13. The method recited in claim 12, wherein if the additional resource is admitted but the unutilized bandwidth is insufficient to transfer all of the bits of the additional resource, then the extraneous bits are dropped without being transferred.

14. The method recited in claim 12, wherein the step of obtaining a utilization value comprises monitoring the data traffic on the peripheral bus with an admission control component on a host system.

15. The method recited in claim 14, wherein the admission control component manages a state diagram.

16. The method recited in claim 15, wherein the states of the state diagram respectively correspond to different degrees of bandwidth utilization.

17. The method recited in claim 16, wherein the admission control component maintains a historical analysis of the data traffic on the peripheral bus.

18. The method recited in claim 12, wherein said plurality of resources comprise a plurality of Universal Serial Bus (USB) devices and said peripheral bus comprises a USB bus.

19. The method recited in claim 12, wherein obtaining the value is performed only for the quasi-isochronous request.

20. The method recited in claim 12, wherein monitoring the actual data transfer rate comprises monitoring actual isochronous bandwidth being used on the peripheral bus.

21. A computer program stored in a tangible medium, the computer program, when executed, causing a processing system to carry out a method comprising:

for each one of a plurality of resources having a bandwidth guarantee for data communications on the peripheral bus, monitoring the actual data transfer rate on the peripheral bus of each one of said plurality of resources;

upon receiving a quasi-isochronous request for admission to the peripheral bus from an additional resource, obtaining a utilization value representative of the extent to which the plurality of resources utilizes the guaranteed bandwidth on the peripheral bus for data communications; and admitting the additional resource to the peripheral bus if the utilization value indicates that the amount of unutilized bandwidth on the peripheral bus for data communications is approximately sufficient to satisfy the data transfer rate of the additional resource.

22. The computer program recited in claim 21, wherein if the additional resource is admitted but the unutilized bandwidth is insufficient to transfer all of the bits of the additional resource, then the extraneous bits are dropped without being transferred.

23. The computer program recited in claim 21, wherein the step of obtaining a utilization value comprises monitoring the data traffic on the peripheral bus with an admission control component on a host system.

24. The computer program recited in claim 23, wherein the admission control component manages a state diagram.

25. The computer program recited in claim 24, wherein the states of the state diagram respectively correspond to different degrees of bandwidth utilization.

26. The computer program recited in claim 25, wherein the admission control component maintains a historical analysis of the data traffic on the peripheral bus.

27. The computer program recited in claim 21, wherein the utilization value is performed only for the quasi-isochronous request.

28. The computer program recited in claim 27, wherein said specific type of transfer request comprises a quasi-isochronous transfer request.

29. The computer program recited in claim 21, wherein monitoring the actual data transfer rate comprises monitoring actual isochronous bandwidth being used on the peripheral bus.

* * * * *